United States Patent [19]

Rothmayer et al.

[11] 4,233,146
[45] Nov. 11, 1980

[54] CELL FLOW DISTRIBUTORS

[75] Inventors: Noel Y. Rothmayer, Madison; Preston Keusch, Paramus; Dietrich E. Kattermann, Morristown, all of N.J.

[73] Assignee: Allied Chemical Corporation, Morris Township, Morris County, N.J.

[21] Appl. No.: 19,056

[22] Filed: Mar. 9, 1979

[51] Int. Cl.³ ............... C25B 13/02; C25B 9/00; H01M 2/14
[52] U.S. Cl. .................... 204/255; 204/257; 204/263; 204/279; 204/301; 429/39
[58] Field of Search ............... 204/255–256, 204/263–266, 268–270, 279, 301; 429/38–39

[56] References Cited

U.S. PATENT DOCUMENTS

| 3,278,336 | 10/1966 | Uline et al. | 429/38 X |
| 3,773,560 | 11/1973 | Bjorkman | 429/38 X |
| 3,814,631 | 6/1974 | Warszawski et al. | 429/39 |
| 4,069,129 | 1/1978 | Sato et al. | 204/279 |
| 4,124,478 | 11/1978 | Tsien et al. | 204/255 |

FOREIGN PATENT DOCUMENTS 482313  1/1970  Switzerland ............... 429/39

Primary Examiner—John H. Mack
Assistant Examiner—D. R. Valentine
Attorney, Agent, or Firm—James Riesenfeld; Gerhard H. Fuchs

[57] ABSTRACT

A distributor comprising two substantially parallel covering sheets separated by a plurality of inserts provides uniform fluid flow through a cell and, consequently, improved cell efficiency. Additionally, the distributor, positioned between a cell's fluid inlet port and membrane spacer, reduces membrane flexing along the line where the spacer and adjoining gasket interface, thus diminishing the incidence of early membrane failure.

13 Claims, 13 Drawing Figures

CELL FLOW DISTRIBUTORS

BACKGROUND OF THE INVENTION

1. Field of the Invention

This invention relates to distributors which provide substantially uniform fluid flow through cells. These devices are useful in fuel cells, electrochemical cells, dialyzers, electrodialyzers, and other apparatus of that type and are particularly useful in dialyzers, especially plural cell electrodialyzers.

2. Description of the Prior Art

Electrodialysis is a process for the partial separation of components of an ionic solution by means of electrical forces which selectively drive ions through membranes. Thus electrodialysis is a selective transport process in which salt or solvent is separated from a feed solution without any component of the solution changing state. As compared with processes such as distillation and freezing, which accomplish separation by changing the state of the solvent, electrodialysis generally requires less energy. The process is coming into increasing use in such applications as production of potable water from sea water or brackish water by desalination, production of salt from sea water, demineralization of organic matter, and preparation and purification of inorganic chemicals. Each of the above-mentioned applications involve contacting one or more solutions with permselective membranes in compartments or cells. A complete unit may comprise up to 2000 or more cells, generally limited by electrical power requirements.

Within each cell of an electrodialyzer, a spacer separates adjacent membranes and determines the fluid flow pattern therein. Generally the spacer configuration is such as to provide either tortuous-path flow or sheet flow. Tortuous-path flow can provide a long residence time of the fluid in each cell. It is accomplished with a spacer in which a cutout pattern provides a sinuous path for the fluid. A drawback of the tortuous-path flow system is that it necessitates a large pressure drop across the cell. In addition, providing a tortuous path requires a substantial spacer area, which reduces the effective membrane area.

Whereas tortuous-path flow is a form of series flow within a cell, sheet flow is parallel flow; i.e., not all fluid elements follow the same path within the cell. Typically, sheet flow is accomplished with a spacer screen which provides a multitude of alternate paths from the inlet to outlet port. Although the screen provides desirable turbulence in the fluid flow, it does not provide uniform flow across the (substantially rectangular) area of the cell. Instead, flow is greater within a substantially oblong area between the inlet and outlet ports. Fluid in the cell which is outside the oblong area is relatively stagnant and does not contribute significantly to the dialysis. Consequently, there is a loss of efficiency.

Another problem afflicting electrodialysis cells of the prior art is early membrane failure. Repeated flexing of the membrane along the line where it passes over the spacer-gasket interface is a primary cause of membrane failure. The failure of a single membrane necessitates a costly and time-consuming process comprising shutdown of the entire electrodialyzer and removal and replacement of the faulty membrane.

Several patents (e.g. U.S. Pat. Nos. 2,735,812; 2,848,402; 2,891,900; 2,948,668; 2,951,027; 3,761,386; 3,933,617; and 4,062,756) disclose membrane spacers which enhance fluid distribution over the membrane area and introduce turbulence, while preventing membrane collapse in the cell. However, these patents leave unsolved the problems of membrane flexing at the spacer-gasket interface and uniform fluid flow across the entire cell area.

U.S. Pat. No. 2,881,124 discloses a device comprising inserts for placing in the fluid inlet and outlet passages of an electrodialysis cell. These inserts support the adjacent membranes across the width of the passage while preventing them from being deformed into the passage. However, that invention makes no provision for preventing collapse of the membrane into the cell itself. The inserts of that invention constrain the fluid to a path which causes a substantial pressure drop and reduces the flow rate. Moreover, the fluid path does not vary across the width of the cell; thus, the flow will be greater near the inlet than near the edge of the cell. As discussed above, nonuniform fluid flow reduces cell efficiency.

U.S. Pat. Nos. 3,814,631 and 4,124,478 disclose apparatus which include fluid flow distributors; however, they have several drawbacks. They depend on a plurality of supply orifices to the cell rather than just one. Each orifice is provided with a plurality of channels to connect the orifice with the central cell area. Fabrication of these distributors is more complicated than fabrication of the distributors of the present invention and, moreover, the flow is less uniform since the channels at the center of the cell are identical to those near the periphery.

SUMMARY OF THE INVENTION

In the present invention, a cell including two membranes separated by a membrane spacer and a gasket surrounding the spacer and having fluid inlet and outlet ports is improved by adding an inlet distributor in communication with and adjoining the inlet port for directing the fluid through the cell, the distributor comprising: a covering comprising two substantially parallel, closely spaced, flexible sheets, the ends of the sheets opposite the inlet port grasping a first edge of the spacer; and a plurality of inserts disposed between and joined to the sheets and so dimensioned and positioned that the flow of fluid through the cell is substantially uniform. The inlet distributor of this invention provides uniform fluid flow across the width of the cell by suitably diverting the fluid stream. Emerging from the inlet port, the stream is first spread out by one or more inlet inserts. Thereafter, an array of three or more main inserts spreads the fluid into a uniform sheet spreading across the width of the cell. To achieve this, the separation between main inserts is smaller near the inlet and larger near the edges. The inserts are preferably larger near the fluid inlet and smaller near the edges. The uniform fluid sheet covering the entire cell area provides higher efficiency than is achieved with nonuniform cell coverage. Optionally, an outlet distributor channels the fluid to the outlet port. Fluid pressure drop across the cell is generally substantially less than in cells employing tortuous-path flow.

The distributors of this invention also prevent excessive membrane flexing and early membrane failure at the spacer edge by enclosing this edge between the two sheets of the flexible distributor covering.

BRIEF DESCRIPTION OF THE DRAWINGS

The invention will be better understood and additional advantages will become apparent when reference is made to the following description and accompanying drawings in which.

DESCRIPTION OF THE PREFERRED EMBODIMENTS

Figure 1A:
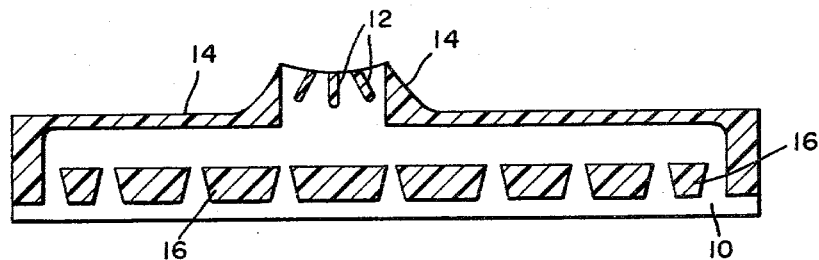
FIGS. 1a and b are plan views of flow distributors of this invention.

For simplicity in describing the figures, references will be made to the "top" and "bottom" of the distributors, with the understanding that the distributors may be installed upside down in an actual cell. Referring to the figures in more detail, FIG. 1a shows an inlet distributor of this invention. Covering sheets 10 have substantially parallel sides, bottom perpendicular to the sides, and top conforming to the inner perimeter of the adjoining gasket (not shown), except for an opening to admit fluid to the distributor. The distributor has inlet inserts 12, frame inserts 14, and main inserts 16. The inserts are disposed between and joined to the covering sheets. They serve both to provide uniform fluid flow and to prevent pressure differences between adjoining cells from constricting the sheets and restricting fluid flow. The covering sheets must have sufficient rigidity to avoid being constricted in the spaces between inserts. The sheets' thickness may be as little as 0.1 mm or less, depending on their material. The material for the sheets and inserts must not react with the fluids which pass through the cell. Many plastics known in the art are suitable; for example, polyethylene, polypropylene etc. The covering sheets and inserts may be composed of the same or different materials.

In operation, the fluid is divided into streams by preferably one or more inlet inserts 12. Size and spacing of the inlet inserts, while not critical, are preferably chosen so as to minimize the diminution of flow rate. At least two frame inserts 14 restrict the fluid stream and direct it toward the spacer (not shown). The main inserts 16, preferably at least three in number, play the key role in providing uniform fluid flow to the spacer, which is grasped by the covering sheets 10. Since practical systems generally involve several piping paths along the length of the apparatus, inlet and outlet ports generally cannot be centered at the top and bottom of the cell. Consequently, main inserts are preferably arranged asymmetrically. The main inserts may all have the same longitudinal dimension but have increasing separation as they are further away from the fluid inlet. Preferably, to avoid very large separations, the main inserts have smaller longitudinal dimensions as well as larger separations away from the fluid inlet.

The selection of main insert size and spacing involves a compromise between the conflicting goals of maximizing flow rate (while minimizing pressure drop)—which alone would dictate no inserts—and achieving uniform flow. The main insert size and separation which provide uniform flow in any given cell are not unique; however, for a given number of inserts the relative flow rate through each channel can be calculated as a function of insert position and spacing. The main inserts may be rectangular or of other convenient shape; however trapezoidal inserts stabilize fluid flow with minimum pressure drop. Preferably the inserts are substantially trapezoidal with substantially equal heights and with their smaller bases down and in a line parallel to the bottom of the covering sheets. Approximate insert width and spacings to give uniform flow may be calculated as follows:

The following parameters are known for any particular cell:

$Q_T$ = rate of fluid flow through the cell
W = cell width
F = distance from left edge of cell to center of inlet port
R = distance from right edge of cell to center of inlet port $$(W = F + R)$$

T = cell thickness (separation between adjoining membranes)

Appropriate values are then chosen for:

h = height of channel (region above main inserts and below frame inserts)
t = separation between covering sheets (cell thickness less thickness of covering sheets)
n = number of orifices (fluid paths formed by main inserts)
f = orifices to the left of the inlet port
r = orifices to the right of the inlet port Assuming the orifice widths, w, are small compared to the main insert widths, taken initially to be all equal, we require the flow through each orifice to be equal. If this flow is Q, we have:

$$Q_T = nQ$$

Flow through the channel to the left of the inlet, $Q_F$ will be $$Q_F = (F/W)Q_T = fQ$$

Fluid flow, Q, through an area, A, is related to the fluid velocity, v, by Q = Av. Assuming uniform flow through the channel, the fluid velocity decreases in equal increments from $$v_1 = (fQ/ht)$$

through the channel between the inlet and the first orifice to $$v_f = Q/ht$$

through the channel above and to the right of the far left orifice. Assuming that fluid velocity through each orifice is proportional to fluid velocity through the channel above and to the right of that orifice, velocities through successive orifices (right to left) are in the ratio of f:f−1:f−2: . . . :1. The i th orifice has area $A_i$ and width $w_i$. The flow, Q, through this orifice is given by:

$$Q = v_i A_i = v_i w_i t$$

$$w_i = (1/v_i)(Q/t)$$

Thus, the orifice widths (right to left) are in the ratio $$\frac{1}{f} : \frac{1}{f-1} : \frac{1}{f-2} : \ldots : 1$$

A convenient value, d, is chosen for the width of the narrowest orifice, which is the first one to the left of the inlet ($w_1 = d$). Each succeeding orifice can then be determined; the last (furthest left) orifice has width, $w_1 = df$. Preferably, d is chosen to be between about W/50 and W/300.

A similar analysis for flow through the channel to the right of the inlet port yields the widths of the orifices to the right of the inlet. These have successive widths of $$d, d\frac{r}{r-1}, d\frac{r}{r-2}, \ldots, dr \text{ (left to right)}$$

Knowing the cell width and choosing a convenient width for the frame inserts, the number of main inserts and the orifice widths determine the main insert widths, initially chosen to be equal. Final widths are determined experimentally as follows:

For a given cell a trial insert configuration is assembled and a dyed fluid put through the distributor and cell. Time-lapse photographs indicate whether the flow is uniform. If it is not, changes are made in insert width and, if necessary, orifice width until the flow is uniform. Only one insert configuration need be determined for each dialysis apparatus, each cell in the apparatus utilizing either that configuration or its mirror image.

Figure 1B:
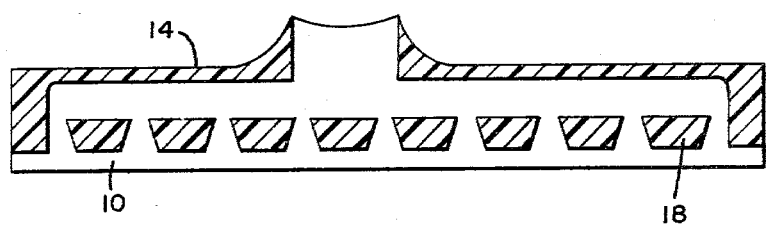

FIG. 1b depicts the outlet distributor of the preferred embodiment. It differs from the inlet distributor in that it has no inlet inserts 12, and the main inserts 18 are of equal size and spacing. In operation, fluid flows from the spacer (not shown) between the substantially parallel, closely spaced, flexible covering sheets 10, which sheets grasp a second edge of the spacer opposite the first edge; through the separations between main inserts 18; and through the opening between frame inserts 14 to the outlet port. Although insert size and position are less critical for the outlet distributor, the main inserts will generally be smaller and their spacing greater than in the inlet distributor to provide maximum fluid flow rate. In the outlet distributor, the main inserts provide support for the distributor structure, preventing it from being constricted by pressure differences on the covering sheets.

Figure 2A:
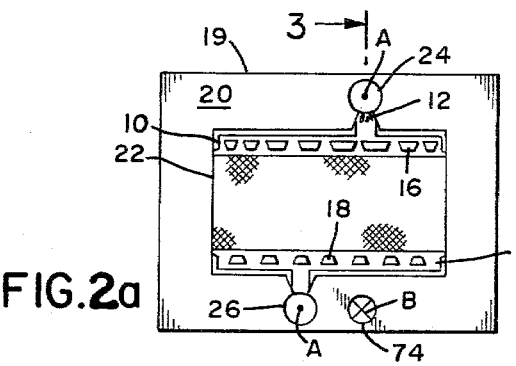
FIGS. 2a to h are plan views of eight successive elements of an electrodialyzer.
Figure 2E:
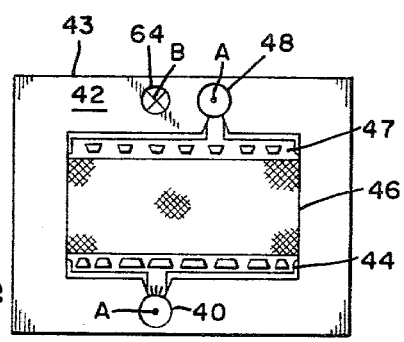
Figure 2B:
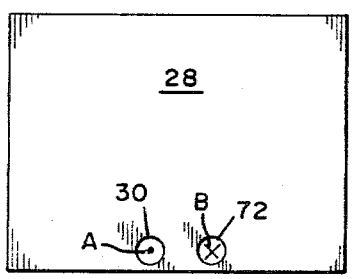
Figure 2F:
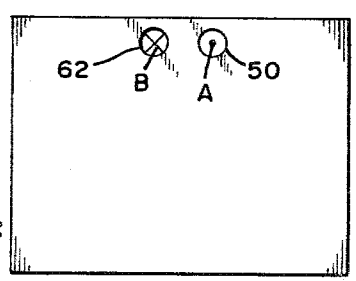
Figure 2C:
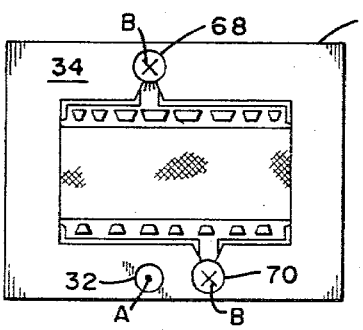
Figure 2G:
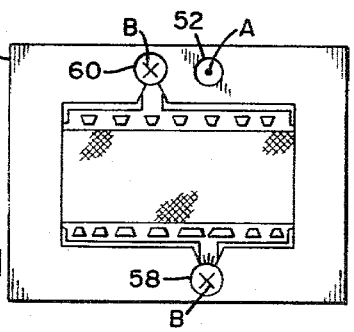
Figure 2D:
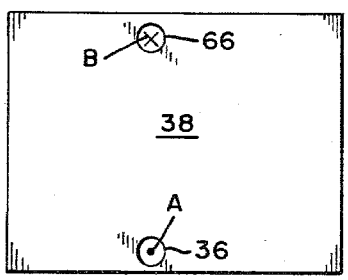
Figure 2H:
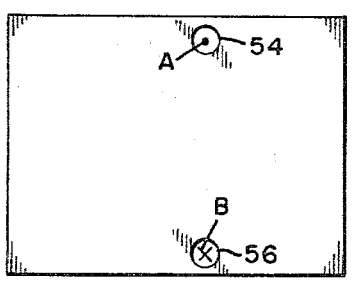

Eight successive elements of an electrodialyzer are shown in separate plan view in FIGS. 2a to h. FIG. 2a shows cell element 19 comprising the distributors of FIG. 1 installed within gasket 20 and with spacer 22 grasped at its ends by covering sheets 10 of the inlet and outlet distributors. A first fluid, fluid A, flows into the cell through inlet 24 and is deflected by inlet inserts 12 and main inserts 16. It flows uniformly over the cell area in contact with spacer 22, membrane 28, and the membrane comprising the previous cell element (not shown). After passing between the main inserts 18 of the outlet distributor, the fluid leaves the cell through outlet port 26. Spacer 22 may be a screen of thermoplastic fibers or similar nonreactive material which provides for desirable turbulent flow of the fluid over the adjoining membranes. Outlet port 26 is aligned with corresponding holes 30 in membrane 28, 32 in gasket 34, 36 in membrane 38, and 40 in gasket 42. After flowing through these aligned holes into cell element 43 of FIG. 2e, fluid A flows through inlet distributor 44 spacer 46, outlet distributor 47, and outlet port 48. Aligned through holes 50, 52 and 54 then carry fluid A to an inlet which is identical to inlet 24, and the process is repeated. Simultaneously a second fluid, fluid B, flows in the opposite direction through holes 56 and 58 into cell element 59 of FIG. 2g. After passing through this cell, fluid B flows through outlet port 60 and aligned holes 62, 64, 66 and 68 into cell element 69 of FIG. 2c. Fluid B flows through this cell, out the outlet port 70, and through holes 72 and 74 to a through hole which is identical to hole 56. The process is then repeated. In a typical electrodialysis process, ion exchange takes place between fluids A and B as they flow through adjoining cells and are in contact through the intervening membranes.

Figure 3:
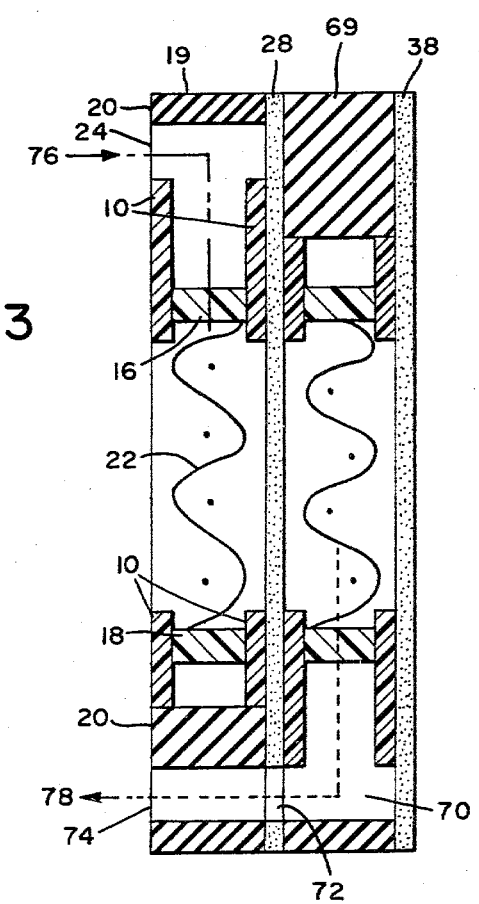
FIG. 3 is a section through 3—3 of FIGS. 2a,b,c and d.

FIG. 3 depicts the flow of fluid A 76 and fluid B 78 in adjoining cell elements 19 and 69 with adjoining membranes 28 and 38. The present invention is not limited to apparatus using two fluids; only one fluid or additional fluids, up to about 8, can be accomodated with, of course, a corresponding change in the number of flow elements required. Fluid may flow through the apparatus serially, in parallel, and any combination of the two. Fluid flow in adjacent cells may be either cocurrent or countercurrent.

Figure 4:
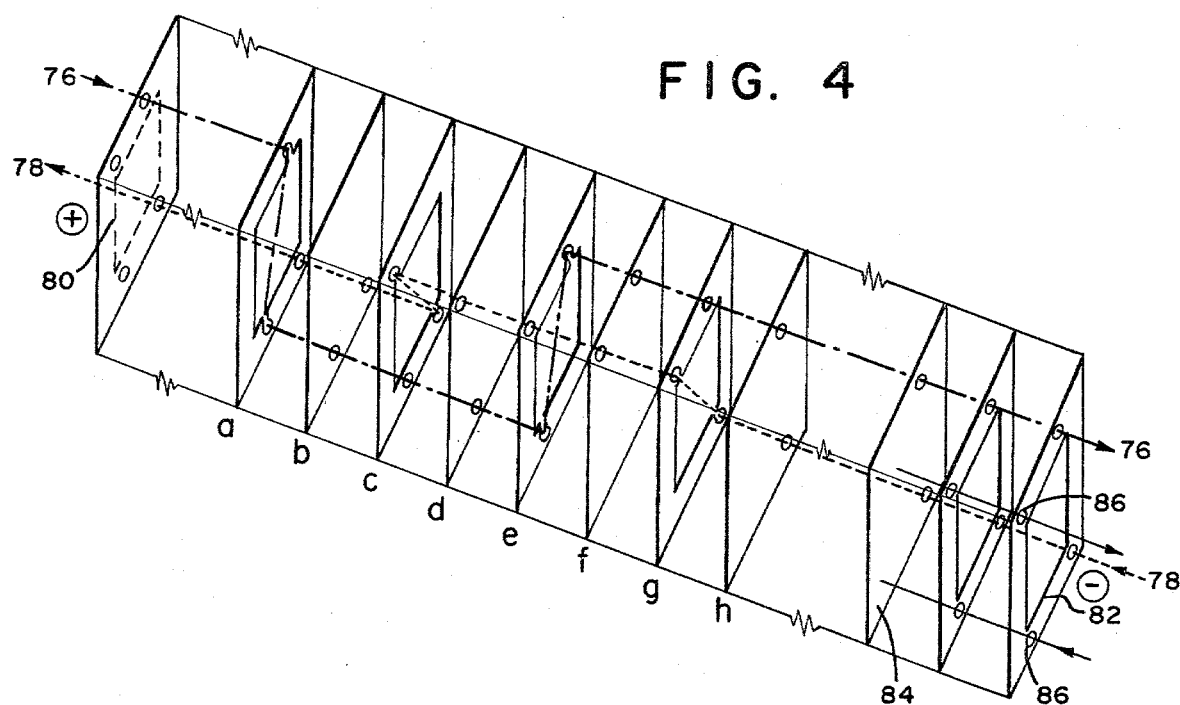
FIG. 4 is a schematic exploded view showing the elements of an electrodialyzer of this invention.

FIG. 4 shows the arrangement of cells in an electrodialyzer with anode 80 at one end and cathode 82 at the opposite end. A fluid electrolyte provides electrical communication between the cathode 82 and the membrane 84 closest to the cathode. The electrolyte enters and leaves the unit through ports 86 in the end plate. In the same manner, electrolyte provides electrical communication between the anode 80 and the membrane closest to the anode (not shown). Fluid A 76 enters at the anode end and exits at the cathode end, while fluid B 78 follows a reverse path.

Figure 5:
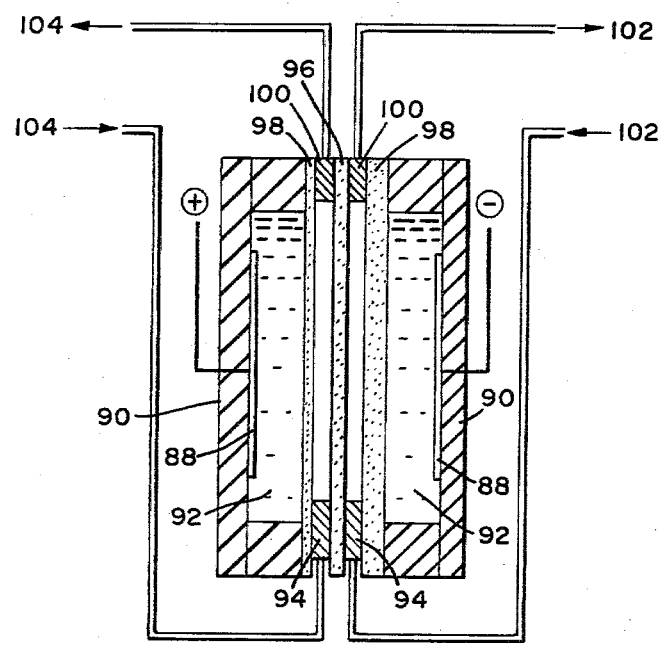
FIG. 5 is a section through another electrodialyzer incorporating the flow distributors of this invention.

FIG. 5 shows a specific electrodialyzing apparatus into which the distributors of this invention may be usefully incorporated. This apparatus comprises a two-stream cell pair electrodialysis stack, in which platinum electrodes 88 are mounted in end plates 90 and electrolyte 92 provides electrical communication between the electrodes and cells. Sodium bisulfite (fluegas) scrubber liquor enters the stack through inlet distributors 94, passes between bipolar membrane 96 and cationic membranes 98, and through outlet distributors 100. The apparatus generates $H^+$ and $OH^-$ on opposite sides of bipolar membrane 96. One stream 102 reacts with $H^+$:

$$NaHSO_3 + H^+ \rightarrow H_2SO_3 + Na^+$$

while the other stream 104 reacts with $OH^-$:

$$NaHSO_3 + OH^- + Na^+ \rightarrow Na_2SO_3 + H_2O.$$

$Na^+$ passes through the cationic membranes as the charge carrier. This apparatus can readily be scaled up to a large number of cells for commercial applications.

Although it is contemplated that the cell flow distributors described herein have their most particular utility in plural cell electrodialyzers, they are also useful in fuel cells, electrochemical cells, dialyzers, and other apparatus of that type. Various changes and modifications as required by the particular application may be made without departing from the scope of the present invention.

We claim:

1. An improved cell including two substantially rectangular, substantially parallel membranes of substantially equal size separated by a gasket in the form of a four-sided frame having a substantially rectangular outer perimeter of dimensions substantially the same as those of said membranes, a substantially rectangular cutout, a fluid inlet port on one side and a fluid outlet port on an opposite side, said membranes also separated by a substantially rectangular membrane spacer substantially coplanar with and surrounded by the gasket, wherein the improvement comprises an inlet distributor in communication with and adjoining the inlet port for directing the fluid through the cell, the distributor comprising:
   (a) a covering comprising two substantially parallel closely spaced, flexible sheets, the ends of the sheets opposite the inlet port grasping a first edge of the spacer; and
   (b) a plurality of inserts disposed between and joined to the sheets and so dimensioned and positioned that the flow of fluid through the cell is substantially uniform.

2. An improved cell as recited in claim 1, wherein the sheets have substantially parallel sides, a first longitudinal end substantially perpendicular to the sides, and a second longitudinal end conforming substantially to the inner parimeter of the adjoining gasket, except for an opening to admit the fluid to the distributor.

3. An improved cell as recited in claim 2, wherein the inserts comprise:
   (a) at least one inlet insert for dividing the fluid into streams,
   (b) at least two frame inserts for restricting the fluid flow and requiring the fluid to flow toward the spacer, and
   (c) at least three main inserts for deflecting the fluid as it flows onto the spacer.

4. An improved cell as recited in claim 3, wherein the main inserts have longitudinal separations which are larger away from the fluid inlet port than near the fluid inlet port.

5. An improved cell as recited in claim 4, wherein the main inserts have smaller longitudinal dimensions away from the fluid inlet port than near the fluid inlet port.

6. An improved cell as recited in claim 5, wherein the main inserts are substantially trapezoidal in shape, with the smaller bases of the trapezoids disposed toward the first longitudinal end of the covering sheets.

7. An improved cell as recited in claim 6, wherein the smaller bases of the trapezoid are along a line substantially parallel to the first longitudinal end of the covering sheets.

8. An improved cell as recited in claim 7, wherein the heights of the trapezoids are substantially equal.

9. An improved cell as recited in claim 1, further comprising an outlet distributor in communication with the adjoining fluid outlet port for directing the fluid to the outlet port, comprising:
   (a) a covering comprising two substantially parallel, closely spaced, flexible sheets, the ends of the sheets opposite the outlet port grasping a second edge of the spacer opposite the first edge; and
   (b) a plurality of inserts disposed between and joined to the sheets and so dimensioned and positioned as to maintain the sheets in substantially parallel alignment with a minimum of interference with the fluid flow.

10. An improved cell as recited in claim 9, wherein the sheets of the outlet distributor have substantially parallel sides, a first longitudinal end substantially perpendicular to the sides, and a second longitudinal end conforming substantially to the inner parimeter of the adjoining gasket, except for an opening to permit the fluid to flow out the outlet port.

11. An improved cell as recited in claim 10, wherein the inserts of the outlet distributor comprise:
   (a) at least two frame inserts for deflecting the fluid flow and requiring it to flow toward the outlet port, and
   (b) at least three main inserts for supporting the distributor and deflecting the fluid as it flows toward the outlet port.

12. An improved cell as recited in claim 11, wherein the main inserts of the outlet distributor comprise equally dimensioned and equally spaced trapezoids, whose smaller bases are disposed toward and lie along a line substantially parallel to the first longitudinal end of the covering sheets.

13. An electrodialyzer comprising at least two spaced-apart substantially planar and substantially parallel electrodes, separated by a plurality of stacked cells, each of which is as recited in claim 1, wherein said cells are substantially parallel to each other and to the electrodes.

* * * * *